United States Patent [19]

Ichinomiya et al.

[11] Patent Number: 4,890,033

[45] Date of Patent: Dec. 26, 1989

[54] LIGHT-EMITTING COMPOSITION AND FLUORESCENT LAMP

[75] Inventors: Keizi Ichinomiya; Kouichi Okada; Yuji Itsuki; Kaname Tsuchikura, all of Anan, Japan

[73] Assignee: Nichia Kagaku Kogyo K.K., Tokushima, Japan

[21] Appl. No.: 212,581

[22] Filed: Jun. 28, 1988

[30] Foreign Application Priority Data

Jun. 29, 1987 [JP] Japan .................................. 62-161565

[51] Int. Cl.$^4$ ........................ H01J 61/44; H01J 61/46
[52] U.S. Cl. .................................... 313/487; 313/485; 252/301.4 F

[58] Field of Search ............... 313/486, 487, 489, 485; 252/301.4 R, 301.4 F

[56] References Cited

U.S. PATENT DOCUMENTS 3,833,827 9/1974 Shaffer ................................. 313/486

Primary Examiner—Kenneth Wieder
Attorney, Agent, or Firm—Nixon & Vanderhye

[57] ABSTRACT

A light-emitting composition includes a phosphor material, and an inorganic white powder material. The inorganic powder material is doped with a dopant of Ti, Ce, Cd, Cs, Sb, K, Sc, Zr, Ge, Al, Lu, La, Gd, Tb, B and/or Si. The light-emitting composition can be applied to the inner surface of a bulb of a fluorescent lamp.

8 Claims, No Drawings

LIGHT-EMITTING COMPOSITION AND FLUORESCENT LAMP

BACKGROUND OF THE INVENTION

1. Field of the Invention

The present invention relates to a light-emitting composition and a fluorescent lamp.

2. Description of the Related Art

In recent years, a demand has arisen for improvements in quantity and quality of light of fluorescent lamps. For this purpose, rare-earth phosphors having a high luminance and excellent color rendering properties have been used for fluorescent lamps.

Rare-earth phosphors are very expensive although they have high luminous efficacy with a high luminance. The cost of the rare-earth phosphor is 10 to 30 times that of a calcium halophosphate phosphor. Attempts have been made to reduce an amount of rare-earth phosphor used in a light-emitting composition. For example, the grain size of a rare-earth phosphor is reduced so that an amount of application can be reduced. However, when the grain size of the phosphor is reduced, a luminance is decreased. In addition, with small grain size, it is difficult to uniformly coat the inner surface of a bulb with a small amount of phosphor, and a bulb surface may be exposed due to a coating error. Further, since the thickness of a phosphor film is decreased, a large amount of sodium is precipitated from glass constituting a bulb during heating in the fabrication process of fluorescent lamps. As a result, a luminous flux maintenance rate of the fluorescent lamp is decreased and color shifting is increased. In addition, the bulb wall may be blackened and a phosphor layer may peel from the bulb wall.

A technique for decreasing an amount of phosphor used in the fabrication of the fluorescent lamp without degrading various characteristics of the lamp is described in Japanese Patent Disclosure (Kokai) No. 57-128452. This prior art describes a light-emitting composition obtained by mixing a predetermined inorganic white powder in a phosphor. However, even this light-emitting composition cannot provide satisfactory results in view of lamp characteristics over time when the composition is used in the fluorescent lamp. In particular, these characteristics are represented by the luminous flux maintenance rate, color shifting, and blackening of the bulb wall.

SUMMARY OF THE INVENTION

It is, therefore, an object of the present invention to provide a light-emitting composition and a fluorescent lamp, wherein an amount of phosphor and particularly a rare-earth phosphor in the fabrication of a fluorescent lamp can be reduced without degrading lamp characteristics as a function of time.

In order to achieve the above object of the present invention, an inorganic white powder material which has an average value of a spectral reflectance in a wavelength range from ultraviolet rays to infrared rays of 90% or more when the values of a spectral reflectance of a smoked magnesium oxide film are given as 100% at all wavelengths is mixed with a phosphor material, the inorganic white powder material being doped with 5% by weight or less of at least one dopant selected from the group consisting of titanium, cerium, cadmium, cesium, antimony, potassium, scandium, zirconium, germanium, aluminum, lutetium, lanthanum, gadolinium, terbium, boron, and silicon.

According to the present invention, the organic white powder material mixed with the phosphor material is one which is low in solubility, excellent in heat resistance and weather resistance, and has high stability against ultraviolet radiation at reduced pressures, as disclosed in Japanese Patent Disclosure (Kokai) No. 57-128452. The average value of the spectral reflectance of the organic white powder material in the wavelength range from ultraviolet to infrared rays (i.e., the wavelength range from 100 nm to 880 nm), usually in the visible range (400 to 750 nm), is 90% or more when the values of the spectral reflectance of the smoked magnesium oxide film are given as 100% at all wavelengths within that range.

A method of forming a smoked magnetic oxide film is described in ASTM Designation: E-259-66 (Reapproved 1973).

Examples of the inorganic white powder material are a light metal oxide (e.g., magnesia, alumina, silica, titania, or zirconia); a composite oxide thereof; an oxyacid salt including a phosphate, a silicate or a sulfate of a metal (e.g., magnesium, aluminum, calcium, titanium, zinc, strontium, zirconium, cadmium, tin, or barium); and a composite oxyacid acid salt thereof.

The average grain size No. ($\overline{D}$) of the inorganic white powder material is preferably 20 $\mu$m or less as measured by a Fisher sub-sieve sizer. The grain size of the inorganic white powder material usually falls within the range of 2 to 15 $\mu$m.

The content of the inorganic white powder material is preferably 10% to 230% of the weight of the phosphor. The inorganic white powder material has a high reflectance. When 10% by weight or more of the inorganic white powder material are mixed with the phosphor material, incident light can be effectively reflected to effectively introduce the light to the phosphor, thereby preventing a decrease in luminance of the phosphor. However, if the content of the powder material exceeds 230% by weight, the luminance of the phosphor is undesirably decreased.

In the present invention, 5% by weight or less, based on the weight of the inorganic powder, of at least one dopant selected from the group consisting of titanium (Ti), cerium (Ce), cadmium (Cd), cesium (Cs), antimony (Sb), potassium (K), scandium (Sc), zirconium (Zr), germanium (Ge), aluminum (A ), lutetium (Lu), lanthanum (La), gadolinium (Gd), terbium (Tb), boron (B), and silicon (Si) are doped in the inorganic white powder material. These dopants suppress precipitation of sodium occurring during heating (e.g., calcination or sintering) in the lamp fabrication, to prevent blackening of the bulb wall. They also suppress formation of a color center of the inorganic white powder material at a wavelength of 185 nm, and prevent adsorption and attachment of mercury in the fluorescent lamp in and on the inorganic white material, thereby minimizing deteriorations of fluorescent lamp characteristics over time.

In particular, titanium, cerium, zirconium, potassium, aluminum, and lanthanum are effective to suppress sodium precipitation upon heating during lamp fabrication. In order to effectively suppress the color center at 185 nm, cadmium, zirconium, germanium, terbium, cesium, scandium, or the like is effective because it absorbs light at this wavelength and does not apply energy to form the color center. In addition, lanthanum, boron, antimony, or the like is effective to prevent adsorption and attachment of mercury. By doping these elements, affinity of the inorganic white powder material to mercury can be reduced, and adsorption and attachment of mercury can be reduced. When the content of the dopant exceeds 5% by weight, a light absorption effect is excessively increased to decrease the initial luminous flux of the fluorescent lamp. The content of the dopant preferably falls within the range of 0.001 to 2% by weight.

In order to dope the dopant in the inorganic white powder material, the inorganic white powder material can be mixed with a doping element in the form of an oxide or carbonate (e.g., $CeO_2$ or $Ce_2(CO_3)_3$), and the resultant mixture can be heated at 1,000° to 1,200° C. for 2 to 3 hours.

No limitations are imposed on the phosphor powder mixed with the white powder. It is effective to use a phosphor which is more expensive than the inorganic white powder material in view of the cost of the resultant composition. A typical example is a rare-earth phosphor. The types of phosphor are a plasma display phosphor (i.e., a vacuum ultraviolet-excited phosphor), a low-pressure mercury lamp phosphor, a high-pressure mercury lamp phosphor, and the like. Examples of the phosphor are $(Ca,Zn)(PO_4)_2$:Tl, $Ca_3(PO_4)_2$:Tl, $(Sr,Mg)_2P_2O_7$:Eu, $Sr_2P_2O_7$:Eu, $YVPO_4$:Eu, $YVO_4$:Eu, $LiAlO_2$:Fe, $SrB_4O_7$:Eu, $Sr_3P_2O_7$:Eu$^{2+}$, $3Sr_3(PO_4)_2 \cdot SrCl_2$:Eu$^{2+}$, $3Sr_3(PO_4)_2 \cdot CaCl_2$:Eu$^{2+}$, $BaMg_2Al_{16}O_{27}$:Eu$^{2+}$, $2SrO 0.84P_2O_5 \cdot 0.16B_2O_3$:Eu$^{2+}$, europium-activated strontium chlorophosphate, cerium and terbium-activated lanthanum phosphate, and europium-activated yttrium oxide. These phosphors may be used singly or in a combination of at least two types of phosphors (e.g., a three-wavelength type phosphor of a mixture of europium-activated strontium chlorophosphate, cerium and terbium-activated lanthanum phosphate, and europium-activated yttrium oxide). In addition, a self-activated phosphor such as calcium tungstate or magnesium tungstate may also be used.

The light-emitting composition of the present invention can be applied to the inner surface of a lamp bulb according to an ordinary method to fabricate a fluorescent lamp, and especially a mercury vapor discharge lamp. A construction of a fluorescent lamp is well known in the art and described, for example, in "Phosphor Handbook" edited by Phosphor Research Society and published by Ohm Inc., Japan (1987), pages 192 and 199–200, which is incorporated herein by reference.

EXAMPLE pv 1

20 wt % of a europium-activated strontium chlorophosphate blue phosphor having average grain size No. ($\overline{D}$) of 4 μm measured by a Fisher sub-sieve sizer, 40 wt % of a cerium and terbium-activated lanthanum phosphate green phosphor having $\overline{D}$ of 4 μm, and 40 wt % of a europium-activated yttrium oxide red phosphor having $\overline{D}$ of 3 μm were mixed to prepare a 5,000-K white phosphor.

30 g of inorganic white power material calcium pyrophosphate ($\overline{D}$ =4 μm) doped with 0.1 wt % of cerium (prepared by heating the phosphor and cerium carbonate at 1100° C. for 3 hours) were mixed with 70 g of the white phosphor to prepare a light-emitting composition. 120 g of 1% nitorocellulose butyl acetate (binder) were added to 100 g of the light-emitting composition to obtain a light-emitting composition slurry and an FL40S fluorescent lamp was prepared according to an ordinary method. A luminous flux maintenance rate and a color shift value of the fluorescent lamp were measured. As a comparison example, a fluorescent lamp was prepared following the same procedures as in Example 1 except that calcium pyrophosphate in which cerium was not doped was used. Results are shown in Table 1.

TABLE 1

| | Characteristics | Example 1 | Comparative Example |
|---|---|---|---|
| | Initial Luminous Flux | 3444 lm | 3405 lm |
| After 1000 Hours | Pseudo Luminous Flux Maintenance Rate (1) | 94% | 92% |
| | Δx (2) | 36 | 52 |
| | Δy (3) | 28 | 58 |
| After 2000 Hours | Pseudo Luminous Flux Maintenance Rate (4) | 90% | 85% |
| | ΔX (2) | 45 | 73 |
| | Δy (3) | 40 | 82 |

(1) The luminous flux after 1,000 hours is divided by the luminous flux after 100 hours, and the quotient is multiplied with 100.
(2), (3) Color misregistration (color shift) values from the initial ON time. When this value is large, color misregistration is large.
(4) The luminous flux after 2,000 hours is divided by the luminous flux after 100 hours, and the quotient is multiplied with 100.

EXAMPLE 2

An FL40S fluorescent lamp was prepared following the same procedures as in Example 1 except that calcium pyrophosphate doped with 0.05 wt % of cesium (prepared by heating a mixture of the phosphor and cesium carbonate at 1100° C. for 3 hours) was used in place of cerium-doped calcium pyrophosphate. The characteristics of the resultant fluorescent lamp were measured. Results are shown in Table 2.

TABLE 2

| | Characteristics | Example 2 | Comparative Example* |
|---|---|---|---|
| | Initial Luminous Flux | 3480 lm | 3405 lm |
| After 1000 Hours | Pseudo Luminous Flux Maintenance Rate (1) | 94% | 92% |
| | Δx (2) | 34 | 52 |
| | Δy (3) | 29 | 58 |
| After 2000 Hours | Pseudo Luminous Flux Maintenance Rate (4) | 92% | 85% |
| | ΔX (2) | 47 | 73 |
| | Δy (3) | 42 | 82 |

*same as the comparative example in Example 1

EXAMPLE 3

An FL40S fluorescent lamp was fabricated following the same procedures as in Example 1 except that an alumina powder ($\overline{D}$ = 3 μm) doped with 1% of lanthanum (prepared buy heating a mixture of the phosphor and lanthanum carbonate at 1000°–1200° C. for 2–3 hours) was used in place of cerium-doped calcium pyrophosphate, and the characteristics of the resultant fluorescent lamp were measured. As a comparative example, a fluorescent lamp was prepared following the same procedures as in Example 3 except that an alumina powder in which lanthanum was not doped was used. Results are shown in

TABLE 3

| | Characteristics | Example 3 | Comparative Example |
|---|---|---|---|
| | Initial Luminous Flux | 3452 lm | 3423 lm |
| After 1000 Hours | Pseudo Luminous Flux Maintenance Rate (1) | 94% | 92% |
| | Δx (2) | 30 | 42 |
| | Δy (3) | 35 | 51 |

TABLE 3-continued

| | Characteristics | Example 3 | Comparative Example |
|---|---|---|---|
| After 2000 Hours | Pseudo Luminous Flux Maintenance Rate (4) | 92% | 87% |
| | ΔX (2) | 46 | 58 |
| | Δy (3) | 44 | 56 |

EXAMPLE 4

FL40S fluorescent lamps (A and B) respectively applied with 2.0 g and 2.5 g of the white phosphor prepared in Example 1, and an FL40S fluorescent lamp (Example 4) applied with a light-emitting composition prepared by mixing 2.0 g of the white phosphor prepared in Example 1 and 2.0 g of calcium pyrophosphate doped with 0.1 % of cerium were fabricated. Lamp characteristics after 2,000-hour ON operations were measured. Results are shown in Table 4.

TABLE 4

| | Lamp | | |
|---|---|---|---|
| Characteristics | A | B | Example 4 |
| Initial Luminous Flux | 3420 l m | 3540 l m | 3550 l m |
| Luminous Flux Maintenance Rate | 73% | 78% | 90% |
| Bulb Wall Blackening (5) | 12 | 9 | 3 |
| Peeling of Coated Layer | considerable | considerable | slight |

(5) The number of lamps subjected to bulb wall blackening among 30 lamp samples.

According to the present invention as has been described above, by using a light-emitting composition prepared by mixing an organic white powder doped with a predetermined dopant in a phosphor, an amount of phosphor and, particularly, a rare-earth phosphor can be reduced while deterioration of the lamp characteristics over time does not occur, thus providing an inexpensive fluorescent lamp having minimum characteristic degradation over time.

What is claimed is:

1. A light-emitting composition comprising:
a phosphor material; and
an inorganic white powder material selected from the group consisting of a light metal oxide, a composite oxide thereof, an oxyacid salt of a metal and a composite oxyacid salt thereof, said inorganic white powder having an average spectral reflectance value in a wavelength range of ultraviolet to infrared rays of not less than 90% when the values of a spectral reflectance of a smoked magnesium oxide film are given as 100% at all wavelengths within that range, said inorganic white powder material being doped with not more than 5% by weight of at least one dopant selected from the group consisting of titanium, cerium, cadmium, cesium, antimony, potassium, scandium, zirconium, germanium, aluminum, lutetium, lanthanum, gadolinium, terbium, boron, and silicon, said inorganic white powder material being contained in an amount of 10 to 230% by weight based on the weight of said phosphor material.

2. The composition according to claim 1, wherein said inorganic white powder material has a grain size of not more than 20 μm.

3. The composition according to claim 1, wherein said inorganic white powder material is selected from the group consisting of magnesia, alumina, silica, titania and zirconia; a composite oxide thereof; a phosphate, a silicate and a sulfate of a metal selected from the group consisting of magnesium, aluminum, calcium, titanium, zinc, strontium, zirconium, cadmium, tin and barium; and a composite thereof.

4. The composition according to claim 1, wherein said inorganic white powder material is selected from the group consisting of alumina and calcium pyrophosphate.

5. A fluorescent lamp including a light-emitting layer formed on an inner wall surface of a bulb, wherein the light-emitting layer includes a light-emitting composition comprising a phosphor material; and an inorganic white powder material selected from the group consisting of a light metal oxide, a composite oxide thereof, an oxyacid salt of a metal and a composite oxyacid salt thereof, said inorganic white powder having an average spectral reflectance value in a wavelength range of ultraviolet to infrared rays of not less than 90% when spectral reflectance of a smoked magnesium oxide film are given as 100% at all wavelengths within that range, said inorganic white powder material being doped with not more than 5% by weight of at least one dopant selected from the group consisting of titanium, cerium, cadmium, cesium, antimony, potassium, scandium, zirconium, germanium, aluminum, lutetium, lanthanum, gadolinium, terbium, boron and silicon, said inorganic white powder material being contained in an amount of 10 to 230% by weight based on the weight of said phosphor material.

6. The lamp according to claim 5, wherein said inorganic white powder material has a grain size of not more than 20 μm.

7. The lamp according to claim 5, wherein said inorganic white powder material is selected from the group consisting of magnesia, alumina, silica, titania nd zirconia, a composite oxide thereof; a phosphate, a silicate, and a sulfate of a metal selected from the group consisting of magnesium, aluminum, calcium, titanium, zinc, strontium, zirconium, cadmium, tin and barium; and a composite thereof.

8. The lamp according to claim 5, wherein said inorganic white powder material is selected from the group consisting of alumina and calcium pyrophosphate.

* * * * *